Sept. 16, 1930.  S. LEAVITT  1,776,037
TIRE SPREADER
Filed July 24, 1929
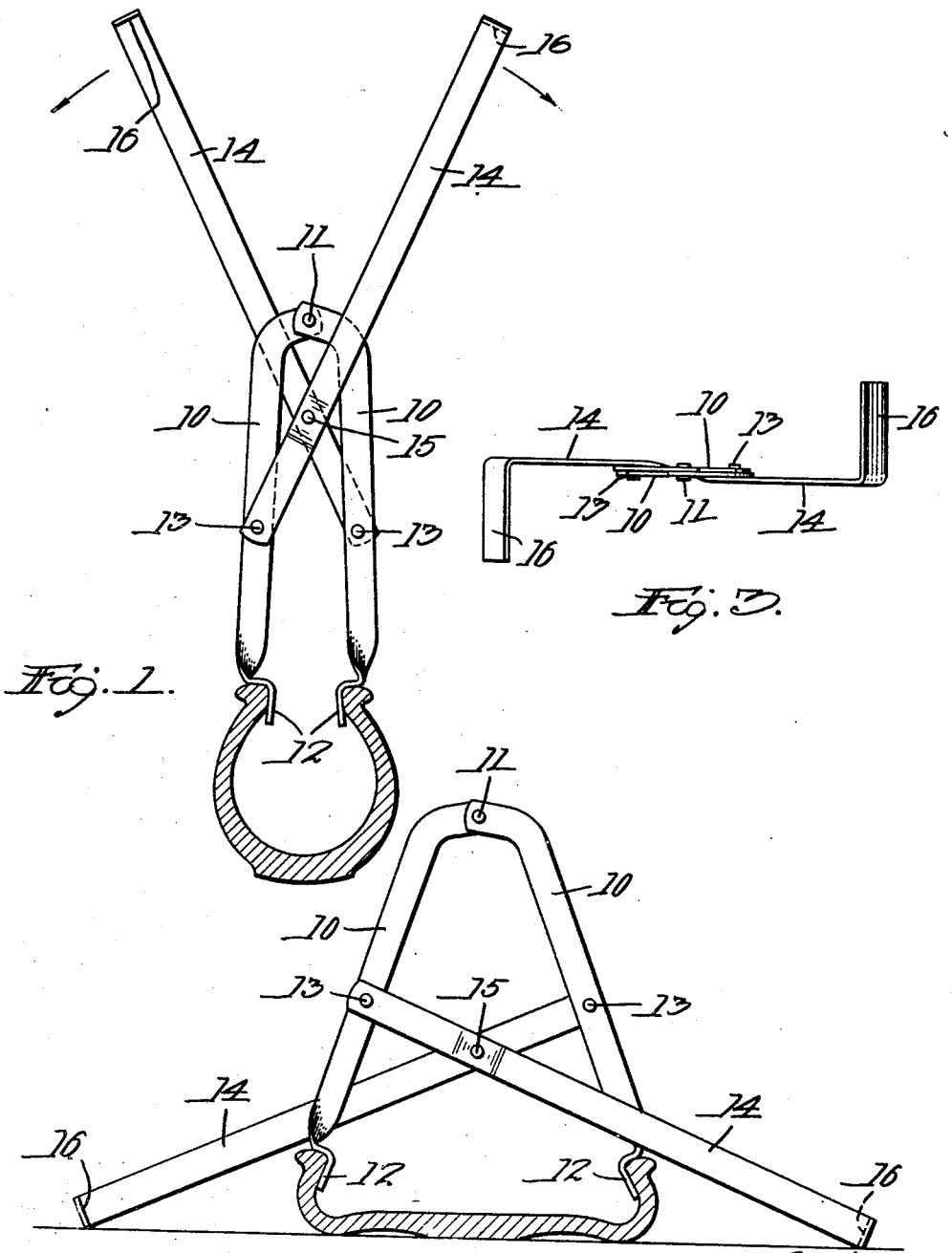

Patented Sept. 16, 1930

1,776,037

UNITED STATES PATENT OFFICE

SAMUEL LEAVITT, OF WORCESTER, MASSACHUSETTS

TIRE SPREADER

Application filed July 24, 1929. Serial No. 380,707.

The principal objects of this invention are to provide a device for very conveniently spreading a tire for the purpose of opening it up for inspection and repairs; to provide a construction in which the leverage is long and the operation of spreading comparatively easy; to provide a construction in which the levers by which the spreader is manipulated can be swung down to the level of the bottom of the tire and rest on the floor on which the tire is located, said levers having horizontal portions serving as feet so as to constitute a stand for holding the tire in its spread condition, the stand also being useful as a display stand to place in a window or on a counter and show to the public the article itself, and also the tire, for advertising purposes.

Other objects and advantages of the invention will appear hereinafter.

Reference is to be had to the accompanying drawings, in which

Fig. 1 is an elevation of a tire spreader in the position it occupies when inserted in the tire and about to be moved to an open position;

Fig. 2 is a similar view showing the tire entirely spread out and the spreader acting as a stand to support itself and also the tire, and Fig. 3 is a plan of the spreader.

In ordinary use the article is employed to spread a tire in an obvious way from the position shown in Fig. 1 to that shown in Fig. 2. For this purpose it involves a pair of arms 10 pivoted together at 11 and each one having a jaw 12. These jaws are right and left handed and engage in the lips of the tire as shown in Fig. 1, so that when the jaws are forced apart the tire will be opened.

For the purpose of manipulating the arms 10 to open the tire, each arm is provided with a pivot 13 a little more than half way from the pivot 11 to the jaws 12. To swing on these pivots 13 are connected the operating levers 14 which cross each other and are pivoted together at 15.

The operating levers are provided with ends 16 constituting feet. These ends are bent outwardly in a horizontal direction and they are also bent in opposite directions from the levers.

The operation is very simple. These feet 16 are convenient handles for the operator to grasp. He places the article in its folded up position and puts the two jaws 12 into the space between the lips or beads of the tire as shown in Fig. 1. Now he forces the two handles 16 outwardly away from each other as indicated by the arrows in Fig. 1. Obviously the result of this is to move the pivots 13 away from each other so that the arms 10 are swung on their pivot 11 and the jaws 12 separated. Of course, the tire can be inspected and the inner tube removed at some intermediate point, but if the handles or feet 16 are moved clear down to the floor, as shown in Fig. 2, the whole thing serves as a stand to hold the tire in position with its sides spread out to the maximum limit. The feet 16, being horizontal and extending in opposite directions and cooperating with the tire itself, furnish a base to prevent the tipping of the tire over, and also to prevent its rolling.

The tire will remain in vertical position when the parts are down with the handles on the floor, as shown in Fig. 2. This feature of the invention can be employed in the repair of the tire, and ordinarily the tire is left in this position while repairs are being made. It also has another function in that it can be used for display purposes in a window, and the tire held conveniently in vertical position by it. This is of value because this article itself can be demonstrated simply by displaying it in a window in this way or in a show-case. Furthermore it can be used to display the tires themselves and leave them in vertical position where they do not have to be bolstered up by any other means, or left in an inclined position against the wall or the like.

This instrument has a minimum number of parts, only four in all besides the rivets, they are simple in character, not likely to get out of order, and the instrument performs its functions with an abundantly sufficient leverage, and at the same time it is economical to make and sell.

Although I have illustrated and described only a single form of the invention I am aware of the fact that modifications can be made therein by any person skilled in the art without departing from the scope of the invention as expressed in the claims.

Therefore, I do not wish to be limited to the exact form shown, but what I do claim is:—

1. In a tire spreader, the combination of a pair of arms pivoted together and having inwardly extending jaws for engaging the sides of a tire inside, a pair of operating levers, each pivoted to one of said arms, said operating levers crossing each other and pivoted together between the arms and having opposite outwardly extending handles at their extreme ends, said operating levers extending from their pivot to the handles in one piece materially beyond the ends of the arms, whereby, when the handles are forced outwardly away from each other with the jaws in a tire, these handles can be brought down to a horizontal surface and will rest thereon and extend horizontally in opposite directions to form a support for the spreader to keep it in vertical position and will also hold the tire itself in vertical position.

2. In a tire spreader, the combination of a pair of arms pivoted together at their upper ends and having inwardly extending jaws at their lower ends for engaging the sides of a tire inside, a pair of operating levers, each pivoted to one of said arms at points between the first named pivot and the jaws and nearer the jaws than the pivots, said operating levers crossing each other and pivoted together between the arms and extending upwardly from the pivots in one piece, materially beyond the ends of the arms and having their extreme ends bent at right angles to form handles, whereby when the handles are forced outwardly away from each other with the jaws in a tire said handles can be brought down to a supporting surface and will rest thereon to form a support for the tire to hold it in vertical position.

In testimony whereof I have hereunto affixed my signature.

SAMUEL LEAVITT.